No. 706,687. Patented Aug. 12, 1902.
C. C. PRATT.
VANNER.
(Application filed Nov. 20, 1901.)
(No Model.) 2 Sheets—Sheet 1.
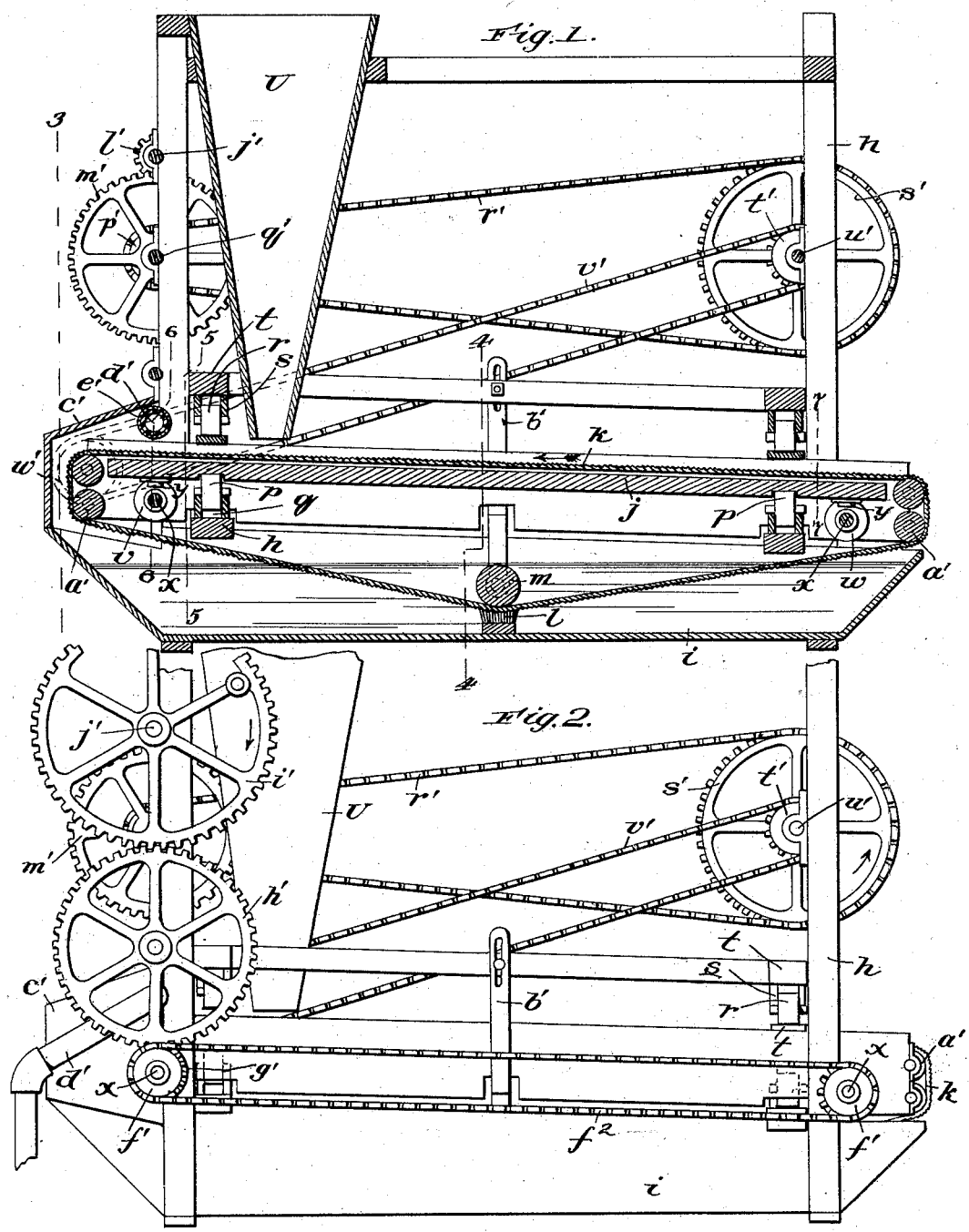
Witnesses
Inventor
C. C. Pratt
By James J Sheehy
Attorney No. 706,687. Patented Aug. 12, 1902.
C. C. PRATT.
VANNER.
(Application filed Nov. 20, 1901.)
(No Model.) 2 Sheets—Sheet 2.
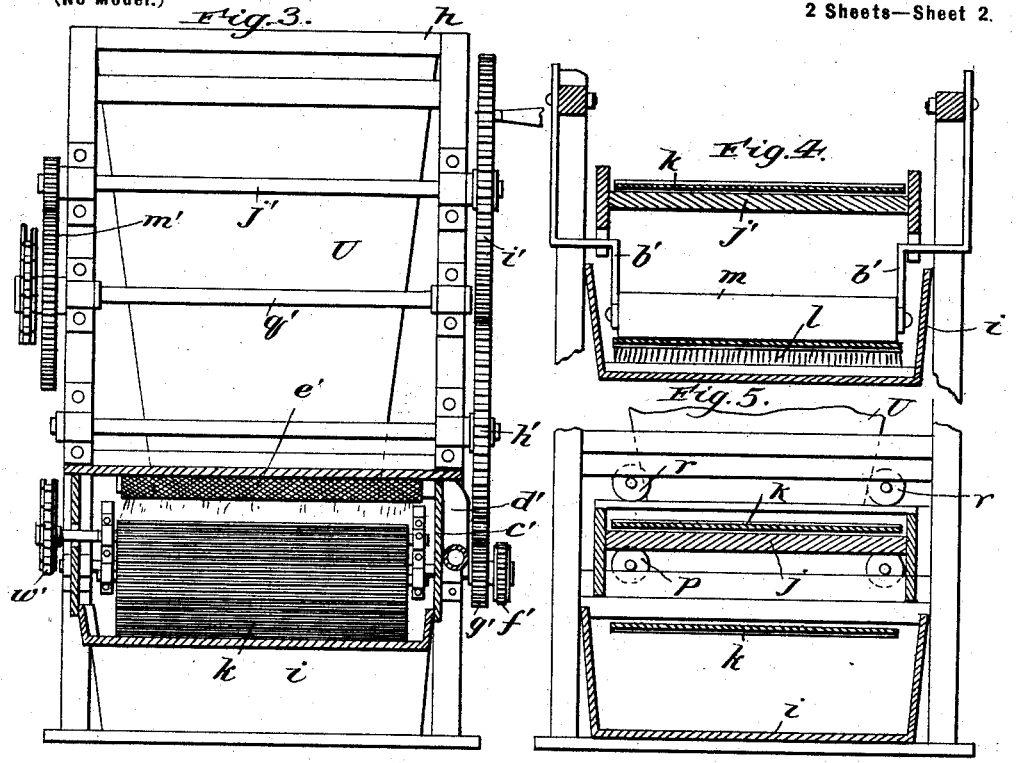
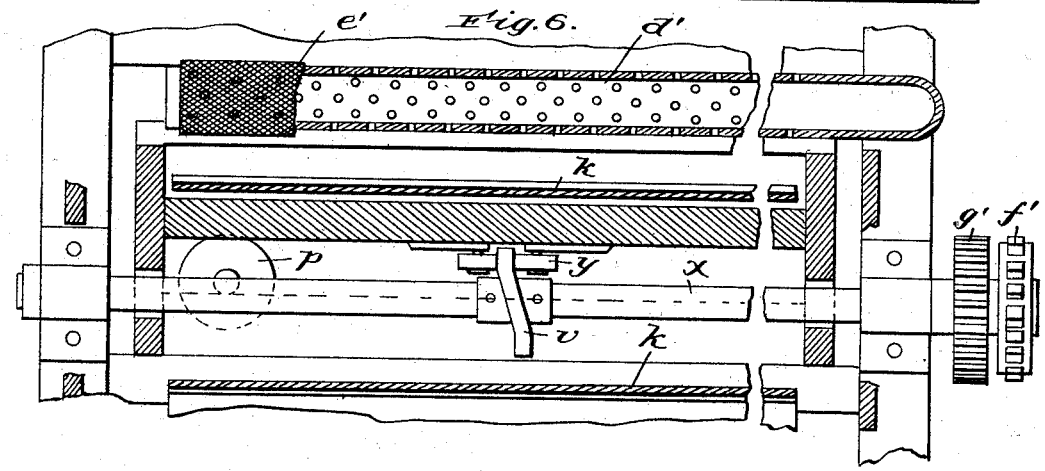
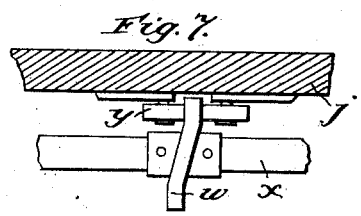

UNITED STATES PATENT OFFICE.

CYRUS C. PRATT, OF PORTLAND, OREGON, ASSIGNOR OF ONE-HALF TO THOMAS HOLLAND, OF PORTLAND, OREGON.

VANNER.

SPECIFICATION forming part of Letters Patent No. 706,687, dated August 12, 1902.

Original application filed June 18, 1901, Serial No. 65,041. Divided and this application filed November 20, 1901. Serial No. 82,976. (No model.)

*To all whom it may concern:*

Be it known that I, CYRUS C. PRATT, a citizen of the United States, residing at Portland, in the county of Multnomah and State of Oregon, have invented new and useful Improvements in Vanners, of which the following is a specification.

My invention relates to improvements in vanners—*i. e.*, machines for recovering or separating metals from fine sand, concentrates, and the like; and it consists in the peculiar and advantageous machine, hereinafter described and claimed, which while designed more particularly for use in conjunction with the ore-washing apparatus constituting the subject-matter of my contemporary application, filed June 18, 1901, Serial No. 65,041, of which this application is a division, is susceptible of being used in connection with ore-washing apparatus of various descriptions.

In the accompanying drawings, Figure 1 is a longitudinal vertical section of my improved machine; Fig. 2, a side elevation of same; Fig. 3, a view partly in end elevation and partly in transverse section, the sectional part being taken in the plane indicated by line 3 3 of Fig. 1; Fig. 4, a detail transverse section taken in the plane indicated by the line 4 4 of Fig. 1; Fig. 5, a transverse section taken in the plane indicated by the line 5 5 of Fig. 1; Fig. 6, an enlarged transverse section taken in the plane indicated by the line 6 6 of Fig. 1, and Fig. 7 a detail section taken on the line 7 7 of Fig. 1 and illustrating one of the cam-wheels for oscillating the jigger-board of the machine in a horizontal plane.

Similar letters of reference designate corresponding parts in all of the several views of the drawings.

The machine in the preferred embodiment of the invention comprises a main frame $h$, of suitable construction; a hopper U, secured in said frame and arranged to receive from a sluice or other source of supply; a tank $i$, supported by the frame in a position below the hopper and adapted to contain water; a jigger or oscillatory platform $j$, interposed between the water-tank and the hopper and slightly pitched or inclined, as best shown in Fig. 1; an endless belt $k$, having its upper stretch arranged over the jigger or platform and between the same and the hopper and its lower stretch passed through the water in the tank $i$; a brush $l$, arranged in the water in the tank $i$ and having for its purpose to remove the precious metals from the belt as the latter passes through the water; a roller $m$, which serves to hold the belt under proper tension against the brush and thereby enables the latter to thoroughly remove the particles of metal from the belt and insures such particles being caught in the water in the tank, and a pipe connected with a suitable source of water-supply and arranged to spray water on the upper portion of the upper stretch of the belt. The jigger or platform $j$ serves to support the upper stretch of the belt to enable the latter to sustain the sand, concentrates, and metals discharged upon it and also serves to impart an oscillatory movement in a horizontal plane to the upper stretch of the belt, this latter with a view of working the sand, &c., toward the lower end of the upper stretch of the belt, which is the right-hand end in Fig. 1, and accelerating the discharge of the same from the machine. The jigger or platform is mounted on antifriction-rollers $p$, which, as best shown in Fig. 1, are free to move between and on the side walls of transverse channels $q$, connected to and forming part of the frame $h$. Said jigger is held down on the said rollers $p$ and against casual vertical movement by antifriction-rollers $r$, which are interposed between channels $s$, similar to the channels $q$, and bear on upper cross-bars $t$ of the jigger, as illustrated. Oscillatory movement is imparted to the jigger through the medium of cam-wheels $v$ $w$, which are mounted on transverse shafts $x$, are oppositely disposed, as best shown in Figs. 6 and 7, and are arranged and adapted to turn between horizontally-disposed antifriction-rollers $y$ on the under side of the jigger. It will be appreciated from this that when the shafts $x$ are rotated in a common direction the opposite end portions of the jigger will be simultaneously moved horizontally in opposite directions, or, in other words, the jigger will be oscillated in a horizontal plane, and this without jerks or shocks, but, on the other hand, in the same manner that an expert moves a pan in separating flour-gold from sand or concentrates. Moreover, by reason of the interposition of the jigger between the antifriction-rollers it will be observed that frictional wear of the jigger and frame is reduced to a minimum, the usefulness of the machine is materially prolonged, and but a minimum amount of power is necessary to actuate the jigger.

The belt $k$ is preferably of rubber and is provided with transverse corrugations in order to receive the metallic particles. It takes over rollers $a'$ at the opposite ends of the jigger and has its upper stretch arranged above the jigger and its lower stretch interposed between the brush $l$ and roller $m$ in the water contained in pan or tank $i$. The roller $m$ is journaled in hangers $b'$, which are adjustably connected to the frame $h$, as best shown in Figs. 1 and 2, in order to permit of the tension of the belt being regulated to enable the brush $l$ to thoroughly remove all of the metallic particles therefrom. The belt is designed to be moved in the direction indicated by the arrow in Fig. 1, and from this it follows that while the water, sand, and concentrates will be moved by the oscillation of the jigger toward the lower end of the jigger and the lower end of the upper stretch of the belt the metallic particles which find their way into depressions of the belt will be carried toward the upper end of the jigger and beneath the hood $c'$, which forms an extension of pan $i$, and thence down into the water contained in the pan to be removed from the belt by the brush $l$. The pipe $d'$ for spraying water on the upper portion of the upper stretch of the belt is disposed transversely between the hood $c'$ and belt and is provided with a plurality of minute apertures and covered by wire-gauze $e'$, the latter to enable it to deliver the water in a finely-divided state to the belt.

The shafts $x$ are provided with sprocket-wheels $f'$, connected by a sprocket-belt $f^2$, and one of said shafts is also provided with a pinion $g'$, intermeshed with a gear-wheel $h'$, which in turn is intermeshed with a gear-wheel $i'$ on the drive-shaft $j'$, whereby it will be seen that when the drive-shaft is rotated in the direction indicated by arrow in Fig. 2 the shafts $x$ will be rotated in a common direction, and by reason of the opposite disposition of the cam-wheels $v$ $w$ the jigger will be oscillated in a horizontal plane on its center.

At its opposite end with reference to the gear-wheel $i'$ the shaft $j'$ is provided with a pinion $l'$, which is intermeshed with a gear-wheel $m'$, fixed together with a sprocket-wheel $p'$ on a shaft $q'$. The sprocket-wheel $p'$ is connected by a chain $r'$ with a sprocket-wheel $s'$, fixed together with a sprocket-wheel $t'$ on a shaft $u'$, and the said sprocket-wheel $t'$ is connected by a sprocket-belt $v'$ with a sprocket-wheel $w'$ on the shaft of one of the rollers $a'$, whereby it will be seen that when the drive-shaft is rotated in the direction indicated by arrow in Fig. 2 the corrugated belt will be moved in the direction indicated by arrow in Fig. 1 to carry the particles of metal deposited in the depressions thereof toward the upper end of the jigger and beneath the hood $c'$.

It is obvious that in practice the machine for separating the precious metals from fine sand, concentrates, and the like may be made of various sizes to be driven by hand or through the medium of any motor suitable to the purpose; also, that any gearing other than that shown and described may be employed to transmit motion from the drive-shaft of said machine to the jigger and the corrugated belt, respectively, without departing from the scope of my invention.

It will be appreciated that the machine is calculated to thoroughly separate silver, gold, lead, tin, zinc, and other precious metals from the concentrates and is also adapted to "clean up" gold without the employment of quicksilver, which is materially advantageous in placer-mining.

I have entered into a detail description of the construction and relative arrangement of the parts embraced in the present and preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my claims.

Having described my invention, what I claim, and desire to secure by Letters Patent, is—

1. In a machine for the purpose described, the combination of a frame, lower and upper antifriction-rollers arranged in said frame, an oscillatory jigger interposed between said lower and upper antifriction-rollers, and having antifriction-rollers on its under side, transverse shafts having oppositely-disposed cam-wheels arranged between and engaging the antifriction-rollers at the under side of the jigger, and means for rotating said shafts.

2. In a machine for the purpose described, the combination of a water-tank, arranged in a suitable frame, lower and upper antifriction-rollers also arranged in said frame, an oscillatory jigger interposed between said lower and upper rollers, and having antifriction-rollers on its under side, transverse shafts having oppositely-disposed cam-wheels arranged between and engaging the antifriction-rollers at the under side of the jigger, means for rotating the said shafts, a brush disposed in the tank, a roller adjustable toward and from the brush, an endless corrugated belt having its upper stretch disposed above the jigger and its lower stretch passed through the tank and between the brush and roller, means for moving said belt, a pipe having openings, and a covering of wire-gauze for supplying water in a finely-divided state to the upper stretch of the belt, and a hopper disposed above said upper stretch of the belt.

In testimony whereof I have hereunto set my hand in presence of two subscribing witnesses.

CYRUS C. PRATT.

Witnesses:
 GEO. W. EASTERBROOK,
 W. P. BENNETT.